United States Patent [19]

Fey et al.

[11] Patent Number: 4,713,567
[45] Date of Patent: Dec. 15, 1987

[54] ELECTROMAGNETIC BRAKE DEVICE FOR A SPORTS TRAINING APPARATUS

[75] Inventors: Rainer Fey, Schweinfurt; Gerhard Dumbser, Niederwerrn, both of Fed. Rep. of Germany

[73] Assignee: Fichtel & Sachs AG

[21] Appl. No.: 912,592

[22] Filed: Sep. 26, 1986

[30] Foreign Application Priority Data

Oct. 2, 1985 [DE] Fed. Rep. of Germany ....... 3535157

[51] Int. Cl.$^4$ .............................................. A63B 69/16
[52] U.S. Cl. .................... 310/105; 272/73; 310/67 R; 310/93; 310/211; 188/164
[58] Field of Search ............... 272/73, DIG. 6; 310/67 A, 68 D, 182, 183, 254, 257, 261; 188/164

[56] References Cited

U.S. PATENT DOCUMENTS

| 994,381 | 6/1911 | Fynn ................................... 310/211 |
| 1,400,047 | 12/1921 | Garcelon ............................ 310/211 |
| 2,784,591 | 7/1985 | Shoor . |
| 3,164,736 | 1/1965 | Sleeter ................................ 310/261 |
| 3,256,454 | 6/1966 | Redwood, Sr. .................... 310/211 |
| 3,375,713 | 6/1965 | Impellizzeri . |
| 3,445,694 | 5/1969 | Campbell et al. ................. 310/183 |
| 3,511,097 | 5/1970 | Corwin .............................. 272/73 |
| 4,084,810 | 4/1978 | Forsman ............................ 272/73 |
| 4,546,280 | 10/1985 | Pflüger ............................ 310/68 D |

FOREIGN PATENT DOCUMENTS

| 013664 | 7/1980 | European Pat. Off. . |
| 058718 | 9/1982 | European Pat. Off. . |
| 131088 | 1/1985 | European Pat. Off. . |
| 2221005 | 11/1973 | Fed. Rep. of Germany . |
| 2436748 | 2/1975 | Fed. Rep. of Germany . |
| 1556393 | 12/1968 | France . |

Primary Examiner—Peter S. Wong
Assistant Examiner—D. L. Rebsch
Attorney, Agent, or Firm—Toren, McGeady & Associates

[57] ABSTRACT

An electromagnetic brake device for a sports training apparatus, especially an ergometer, includes a stator, and a rotor rotatable in relation to the stator about a rotation axis. The stator and the rotor each have multipole iron circuits which together form a magnetic flux circuit, one of the iron circuits having magnetic remanence properties. With the iron circuits, there are associated windings of which the winding allocated to the magnetically remanent iron circuit is formed as field winding and the other winding is formed as generator winding. The field winding is connected through a slip ring arrangement with the generator winding. With the iron circuit of the generator winding, there is associated a short-circuit winding. The size amplitude of the current fed to the field winding from the generator winding is adjustable by a control circuit. In this way, the electromagnetic brake moment of the brake device can be adjusted without wear.

8 Claims, 3 Drawing Figures

ELECTROMAGNETIC BRAKE DEVICE FOR A SPORTS TRAINING APPARATUS

BACKGROUND OF THE INVENTION

The invention relates to an electromagnetic brake device for a sports training apparatus, especially an ergometer.

Ergometers are standing apparatuses operable similarly to a bicycle, which have, in place of the cycle rear wheel a flywheel which is driven by means of a pedal drive system. An adjustable brake device acting upon the flywheel, determines the resistance which is opposed to the pedal drive. The ergometer can be formed as a pure home training apparatus. However, it can also be coupled with measuring appliances which measure the energy consumed in turning the pedals and possibly medical data of the training person.

In simple ergometer apparatuses, the brake device is made as a mechanical friction brake, for example, in the form of a brake band or a roller brake. However mechanical friction brakes are affected by wear.

It is further known to associate an eddy-current brake with the flywheel. Such an eddy-current brake is in itself wear-free. In known eddy-current brakes, however, electric energy must be supplied by a commercial power service. In known commercial power independent eddy-current brakes, a permanent magnet must be mechanically varied in position for the adjustment of the braking power.

The invention is directed towards the provision of an electromagnetic brake device for a sports training apparatus, especially an ergometer, the brake power of which is electrically adjustable, but which is operable without the supply of external electric energy. The brake device is further to be of constructively simple design.

SUMMARY OF THE INVENTION

The electromagnetic brake device in accordance with the invention comprises a stator and a rotor rotatable in relation to the stator about a rotation axis. The stator and the rotor each have multi-pole iron circuits which together form a magnetic flux circuit. With the iron circuits, there are associated windings, of which one is formed as field winding and the other as generator winding. The iron circuit of the field winding has magnetic remanence properties, so that on relative rotation of rotor and stator, an initial voltage is induced in the generator winding. The field winding is connected through a slip ring arrangement with the generator winding and is excited by the current generated by the generator winding. An electric control device, which in the simplest case is a potentiometer but is preferably formed as a current regulator circuit, permits adjustment of the current fed to the field winding. Moreover, with the iron circuit of the generator winding, there is associated a short-circuit winding. The magnetic field of the field winding, variable by means of the electric control device, induces a short-circuit current in the short-circuit winding and thus produces a brake moment proportional to the exciting current.

In a preferred embodiment of the invention, the magnetic remanence iron circuit provided with the field winding is formed as a claw-pole iron circuit. The field winding here is a coil concentric with the axis of rotation, while the claw-pole iron circuit comprises a magnetic remanence yoke tube, concentric with the coil, of a magnetically hard steel, especially C-35, the axial end faces of which are adjoined, without air gaps, by claw-pole carriers of annular disc form. The claw-pole carriers have claw-poles protruding axially towards one another which alternate in the circumferential direction and, accordingly, generate a multi-pole magnetic field, alternating in the circumferential direction, despite direct-current excitation of the field coil.

The iron circuit of the generator winding has poles lying radially opposite to the claw-pole with coils allocated to the poles. The coils of the generator winding can be lap windings, but preferably, wave windings are provided. The short-circuit winding is also preferably a wave winding. However the short-circuit winding can also be made in the form of a squirrel-cage winding with conductors or bars extending axially between two short-circuit rings.

In a preferred embodiment, the stator is arranged radially within the rotor and carries radial fan blades axially laterally of its iron circuit. The claw-pole iron circuit forms axial passages between the rotor and the stator which, in combination with the radial fan, ensure an adequate cooling of both the rotor and the stator. Tuhe radially externally situated rotor expediently also carries the generator winding and the short-circuit winding, further improving the removal of the braking heat.

The control device is preferably combined with the stator into one construction unit and also carries the brushes allocated to the slip ring arrangement. In this way, as a whole, a compact construction unit can be achieved.

The brake device according to the invention can not only be used for ergometer appliances but also in training apparatuses of a general nature, for example, in rowing or roller running training apparatuses.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAIL DESCRIPTION OF THE DRAWINGS

Figure 1:
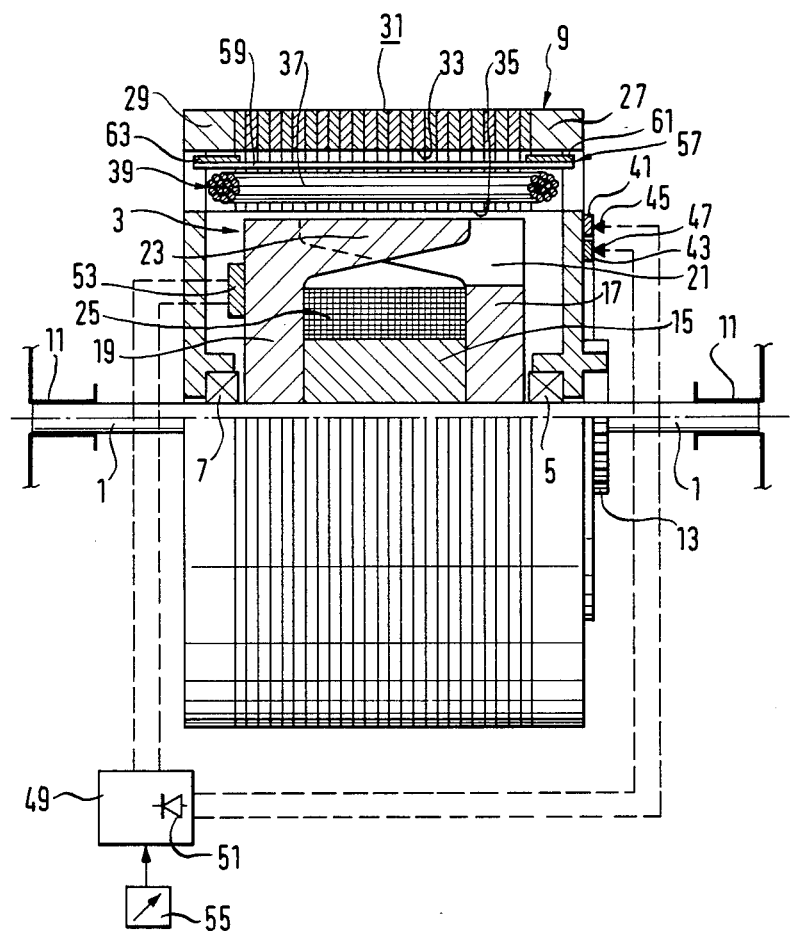
FIG. 1 shows a brake device, represented diagrammatically, partially in axial longitudinal section, for a training apparatus, especially an ergometer.

The electro-magnetic brake device according to FIG. 1 comprises a stator 3 seated non-rotatably on a spindle 1 and a rotor 9 rotatably mounted on the spindle 1 in bearings 5, 7. The spindle 1 is secured in a fork 11 of a training apparatus, for example an ergometer, and holds the stator 3 non-rotatably on the fork 11. On the rotor 9 there is secured a toothed drive wheel 13 for a drive chain or a drive toothed belt by way of which the rotor 9 can be rotated in relation to the stationary stator 3 by a pedal drive system or the like.

The stator 3 is formed as claw-pole wheel the iron circuit of which comprises a yoke tube 15 non-rotatably surrounding the spindle 1 and claw-pole carriers 17, 19 axially on both sides of the yoke tube 15. The claw-pole carriers 17, 19 are of annular disc form and adjoin the axial end faces of the yoke tube 15 without air gaps. On their external circumferences the claw-pole carriers 17, 19 carry a plurality of claw-poles 21, 23 staggered in relation to each other in the circumferential direction. The claw-poles 21, 23 of the two claw-pole carriers 17, 19 protrude towards one another from axially opposite sides of the yoke tube 15, overlap one another in the axial direction and extend substantially over the entire axial length of the yoke tube 15. Seen in the circumferential direction of the stator 3, the claw poles 21, 23 alternate with one another. The yoke tube 15 consists of magnetically remanent steel, for example C-35 steel. A field coil 25 is arranged coaxially with the spindle 1 in a space delimited by the claw-poles 21, 23. The field coil 25 surrounds the yoke tube 15 and on direct current excitation, generates a direct magnetic field in the claw-pole carriers 17, 19, which alternates locally in the circumferential direction between the claw-poles 21, 23.

Between two bearing flanges 27, 29 mounted on the bearings 5, 7, the rotor 9 has a laminated yoke ring 31 which closely but contactlessly encloses the stator. The yoke ring 31 comprises, on its internal circumferences, a plurality of axially extending grooves 33 which, in the circumferential direction, form poles 35 between them. The poles 35 of the rotor 9 lie radially opposite to the claw-poles 21, 23. The number of poles 35 of the rotor 9 is an even multiple of the number of poles 21, 23 of the stator 3. In the grooves 33, there extend coil conductors 37 of a generator winding 39 in which the magnetic field generated by the field coil 25 induces an alternating current voltage on rotation of the rotor 9. The terminals of the generator winding 39 are connected with two annularly closed slip rings 41, 43, against which brushes 45, 47 resiliently rest.

There is connected to the brushes 45, 47 a current-regulator circuit 49 which rectifies the alternating current voltage generated by the generator winding 39 on rotation of the rotor 9, in a rectifier circuit 51 (not further shown) and feeds it as direct current with adjustable amplitude through a conventional current regulating circuit to the terminals, indicated at 53, of the field coil 25. The amplitude of the exciting direct current is adjusted by an ideal value setting means 55, formed as an adjustable resistor, of the current-regulator circuit 49.

The yoke ring 31 of the rotor 9 further carries a short-circuit winding 57 coupled with the magnetic field of the stator 3. The short-circuit winding 57 has conductors 59 laid into the grooves 33, which are connected with one another at their ends by plate rings 61, 63.

The magnetically remanent yoke tube 15, magnetized in the production of the brake device, produces in the generator winding 39 an initial magnetic flux which, on rotation of the rotor 9, independently of external current sources, effects an initial excitation of the field coil 25 which subsequently increases itself, due to the feedback effect of the field coil 25 fed from the generator winding 39, up to the value set by the ideal value setting means 55. In accordance with the magnetic flux of the generator coil 39, the magnetic flux of the short-circuit winding 57 and thus the brake moment opposing the rotation of the rotor 9 also increases. The brake moment is substantially proportional to the excitation current of the field coil 25 and can thus be adjusted by the ideal value setting means 55. No external current sources are necessary since the working voltage of the current-regulator circuit 49 is also generated by the generator winding 39.

The short-circuit winding 57 generates the brake moment electromagnetically, since it produces a counter-magnetic field which acts against the field of the field coil 25. The short-circuit winding 57 consists preferably of material of good electrical conductivity, for example copper or aluminium. The number of poles of the short-circuit winding 57 can differ from the number of poles of the generator winding 39.

Figure 2:
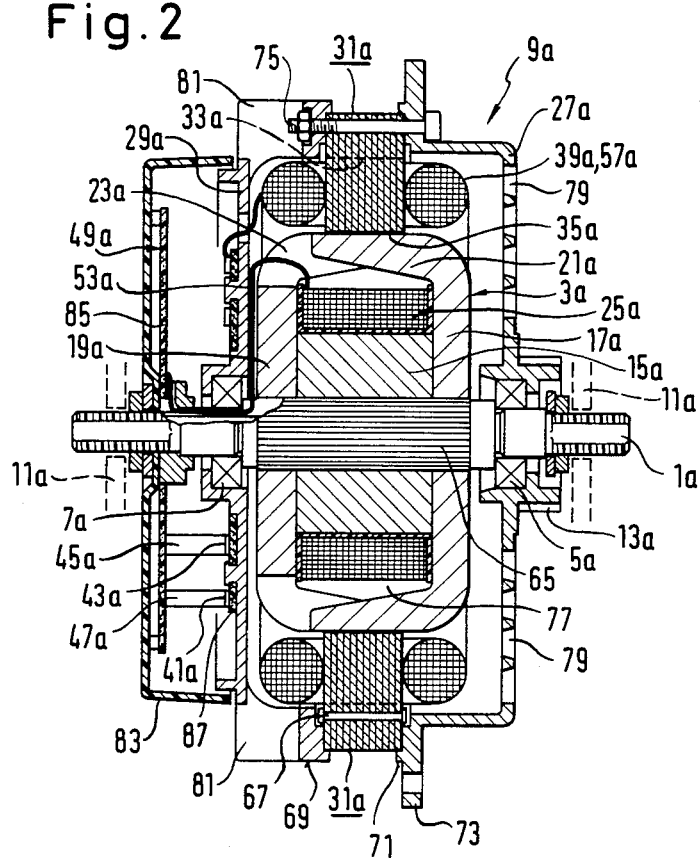
FIG. 2 shows an axial longitudinal section through a variant of the brake device.

FIG. 2 shows a variant of the brake device according to FIG. 1. Parts of like effect are provided with the reference numerals of FIG. 1, and for distinction, with the letter a. For more detailed explanation, reference is mde to the description of FIG. 1. Individually, the parts with the reference numerals 1 to 49, 53, 57 and 59 correspond to one another. The parts 51 and 55, while not pictured in FIG. 2, are nonetheless present.

The brake device according to FIG. 2 again comprises a stator 3a, formed as claw-pole wheel, the claw-pole iron circuit which comprises a magnetically remanent yoke tube 15a, two claw-pole carriers 17a, 19a axially adjoining without air gaps, and a field coil 25a. The yoke tube 15a and the claw-pole carriers 17a, 19a are pressed on to a grooved section 65 of the spindle 1a. The section 65 has a larger diameter than the regions adjoining axially on both sides thereof and fixes the bearings 5a, 7a, carrying the rotor 9a, in the axial direction. The rotor 9a has a laminated yoke ring 31a divided by axially extending grooves 33a into poles 35a. The lamination pack of the yoke ring 31a is assembled into a unit by rivets 67. The bearing flanges 27a and 29a of the rotor are provided, on their external circumferences, with guide faces 69, 71 for the flywheel of the ergometer, which can be secured to a securing flange 73 of the bearing flange 27a. Screws 75 connect the yoke ring 31a and the bearing flanges 27a, 29a into one unit.

Figure 3:
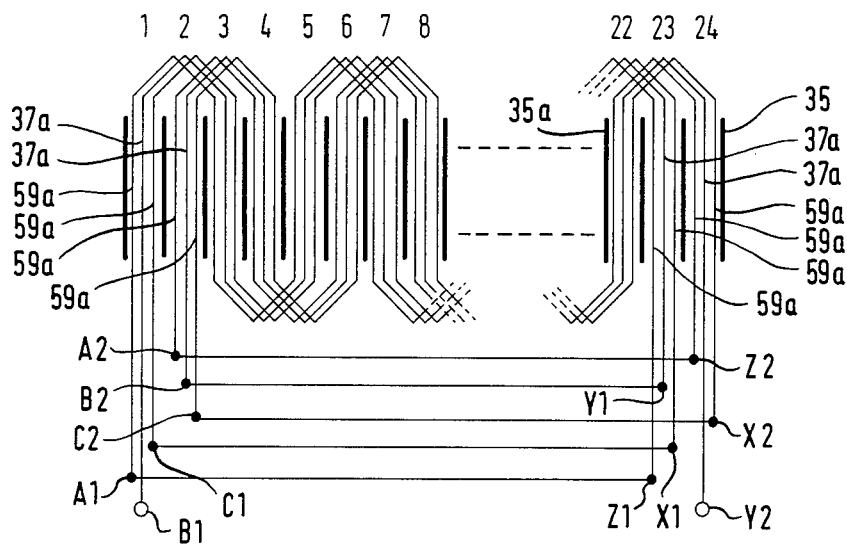
FIG. 3 shows a circuit diagram of a rotor winding of the brake device according to FIG. 2.

In departure from the generator winding 39 in FIG. 1, formed as lap winding, the generator winding 39a in FIG. 2 is formed as wave winding. The short-circuit winding 57a is likewise formed as wave winding and laid, in accordance with the winding pattern in FIG. 3, together with the generator winding 39a into the grooves 33a of the yoke ring 31a. In the embodiment as illustrated the yoke ring 31a has 24 poles 35a in the case of 12 claw-poles of the stator 3a. The conductors 37a and 59a of the windings 39a, 57a are each laid in steps of 2 grooves in the form of a three-layer winding. The winding commencements are designated by A, B and C and the winding ends by X, Y and Z. The subsequent digit 1 in each case designates odd-numbered grooves, the digit 2 even-numbered grooves. The conductors are laid in the winding sequence A-B-C into the grooves 33a. The generator winding 39a comprises the winding lay-out B1-Y1-B2-Y2. There are four short-circuit windings present: A1-Z1, C1-X1, A2-Z2 and C2-X2. The beginning and end of each short-circuit winding are connected with one another, as may be seen from FIG. 3. A winding of the proposed kind generates a relatively uniform brake moment, independently of the rotational position of the rotor relative to the stator.

The claw-poles 21a and 23a of the stator 3a leave axially extending ventilation passages 77 between the field coil 25a and the internal circumference of the yoke ring 31a. While the bearing flange 27a has a plurality of axial openings 79, the bearing flange 29a is provided with a plurality of radial fan blades 81 distributed in the circumferential direction, which are in communication, by way of radial piercings of the bearing flange 29a, with the passages 77. The radial fan blades 81, on rotation of the rotor 9a, ensure an axial air current in the housing formed by the bearing flanges 27a, 29a and the yoke ring 31a.

A lid 83 surrounding a circuit board 85 is secured on the spindle 1a in the vicinity of the bearing flange 29a provided with the radial fan blades 81. The circuit board 85 carries the components of the current-regulator circuit 49a and the brushes 45a and 47a. The slip-rings 41a, 43a allocated to the brushes 45a, 47a are provided by printed circuitry on a board ring 87 which is secured, for example riveted, to the bearing flange 29a. Connecting conductors of the generator winding 39a are led out through openings of the bearing flange 29a and connected to the slip rings 41a, 43a. The connecting conductors 53a of the field coil 25a are conducted in an axial groove of the spindle 1a beneath the bearing 7a to the circuit board 85. The brake device thus forms a compact unit operable, as a whole, independently of the commercial power source. The ideal value setting means 55, by which the brake moment can be adjusted, can be connected through a separate cable with the circuit board 85 and arranged at a suitable position for operation.

While specific embodiments of the invention have been shown and described in detail to illustrate the application of the inventive principles, it will be understood that the invention may be embodied otherwise without departing from such principles.

What we claim is:

1. An electromagnetic brake device for a sports training apparatus, especially an ergometer, comprising:
    a stator and a rotor, rotatable in relation to the stator about an axis of rotation, wherein the stator and the rotor each comprise multi-pole iron circuits which together form a magnetic flux circuit, one of the iron circuits having a magnetic remanence property, the iron circuits having windings allocated thereto, of which the winding allocated to the magnetically remanent iron circuit is formed as field winding and the other winding is formed as generator winding;
    a slip ring arrangement for connecting the field winding with the generator winding;
    a short-circuit winding allocated to the iron circuit of the generator winding; and
    control circuit means for adjusting a magnitude of current fed to the field winding from the generator winding.

2. A brake device according to claim 1, wherein the field winding is formed as a field coil concentric with the rotation axis, and the magnetically remanent iron circuit is formed as claw-pole iron circuit with a plurality of claw-poles protruding from axially opposite sides of the field coil axially towards one another and alternating in the circumferential direction, and wherein the iron circuit of the generator winding comprises a soft iron yoke ring surrounding the magnetically remanent iron circuit, the soft iron yoke ring having formed therein axially extending grooves which, in turn, form radially inwardly extending poles lying radially opposite to the claw-poles, conductors of the generator winding and of the short-circuit winding being laid in the grooves of the soft iron yoke ring, and wherein the generator winding comprises at least one winding allocated to the poles.

3. A brake device according to claim 2, wherein the generator winding and the short-circuit winding are formed as wave windings.

4. A brake device according to claim 2, wherein the short-circuit winding comprises, axially on both sides of the iron circuit, short-circuit plate rings which are connected with one another by conductors extending in the grooves.

5. A brake device according to claim 1, wherein the pole number of the generator iron circuit is equal to an even-numbered multiple of the pole number of the field iron circuit.

6. A brake device according to claim 1, wherein the slip ring arrangement comprises two annular, closed slip paths and wherein the control circuit means is connected through a rectifier stage to the generator winding and is formed as a direct current regulating circuit.

7. A brake device according to claim 1, wherein the rotor is supported rotatably at the axis of rotation and the stator comprises a spindle for securing the stator to the training apparatus and wherein the control device includes a circuit board, secured axially laterally of the stator iron circuit on the spindle, having components of the control circuit means and brushes associated with the slip ring arrangement mounted thereon.

8. A brake device according to claim 1, wherein the stator carries an excitation winding, and the rotor embraces the stator and carries the generator winding and the short-circuit winding, the rotor comprising radial ventilation vanes axially sideways of the rotor iron circuit.

* * * * *